United States Patent [19]

Bowersox et al.

[11] Patent Number: 4,512,430

[45] Date of Patent: Apr. 23, 1985

[54] ELECTRONIC COUPLED-IN-MOTION RAILROAD TRACK SCALE

[75] Inventors: Bruce V. Bowersox, Moorcroft; Thomas I. Shepherd, Gillette, both of Wyo.

[73] Assignee: AMAX, Inc., Greenwich, Conn.

[21] Appl. No.: 515,473

[22] Filed: Jul. 20, 1983

[51] Int. Cl.³ ............................................. G01G 19/04
[52] U.S. Cl. ......................................... 177/163; 177/3; 177/4; 177/7; 177/17; 177/25; 177/DIG. 8
[58] Field of Search .................... 177/163, 3, 4, 5, 7, 177/17, DIG. 8, 25

[56] References Cited

U.S. PATENT DOCUMENTS 2,806,685 9/1957 Vande Sande et al. ............ 177/7 X
3,276,525 10/1966 Cass .................................... 177/3 X
4,134,464 1/1979 Johnson et al. ........................ 177/3

Primary Examiner—E. A. Goldberg
Assistant Examiner—Fred L. Kampe
Attorney, Agent, or Firm—Roland T. Bryan

[57] ABSTRACT

An electronic coupled-in-motion railroad track scale is disclosed and comprises four track logic switches for detecting forward or backward train axle movement, a programmable digital voltmeter connected to load cells for effecting the weighing of the train cars, and a computer (CPU) for controlling the voltmeter as well as the track logic switches, and for correlating the axle numbers to the weight determined for each particular car. The four track switches are situated such that two switches are located in close proximity on either end of the weighbridge and the train track interface. Together with the logic circuits, the switches indicate when an axle comes on or goes off the weighbridge, and in which direction the axle is moving. In this manner, if reweighing is desired, the train may be backed up or forwarded to the particular car in question without reweighing the entire train.

9 Claims, 7 Drawing Figures

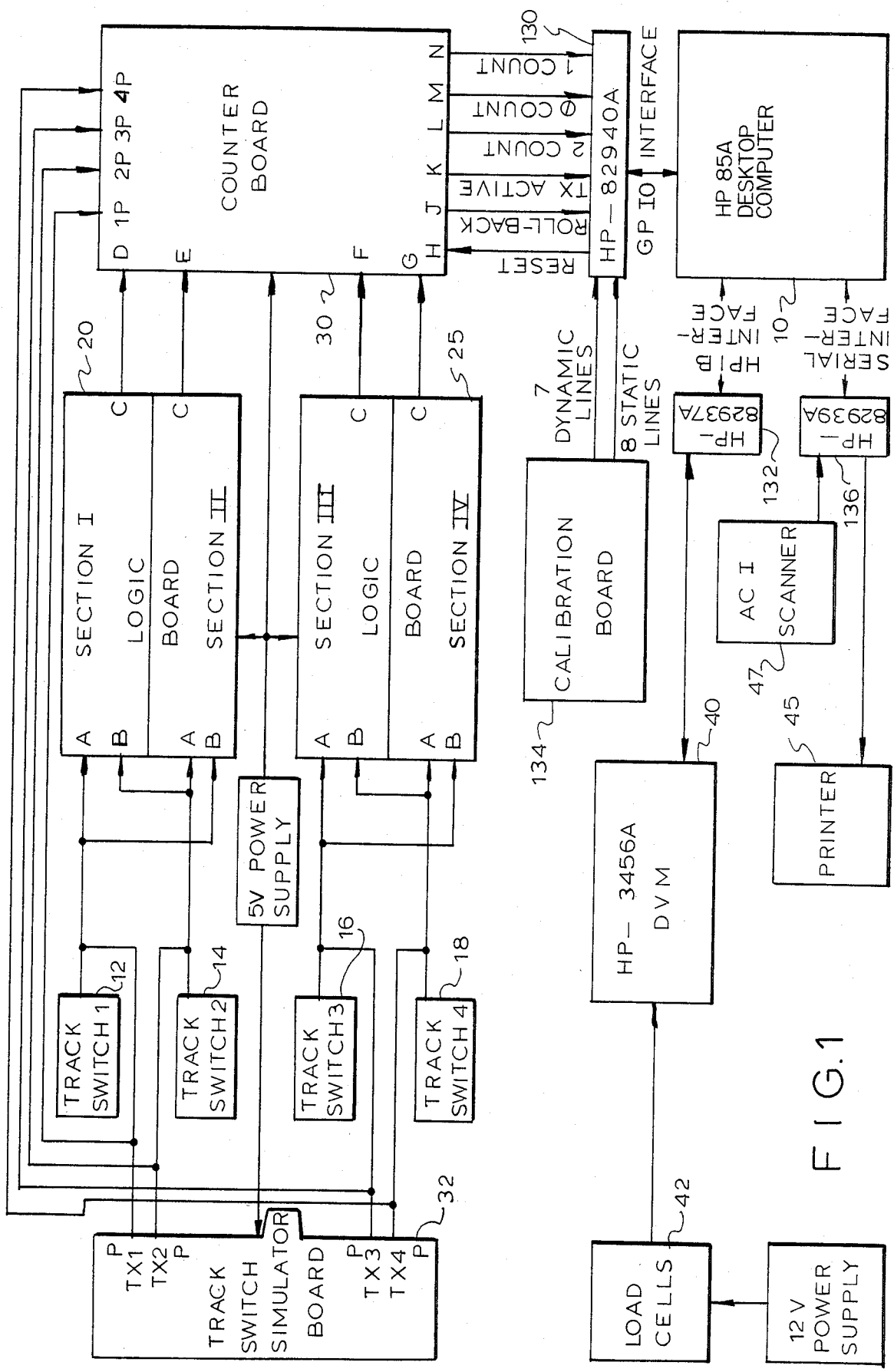
F I G. 1

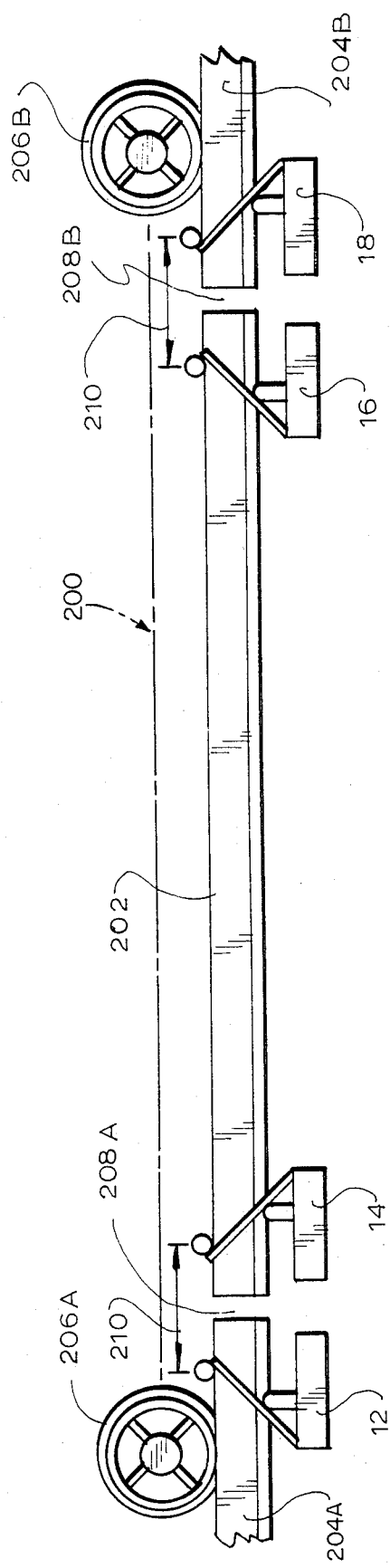

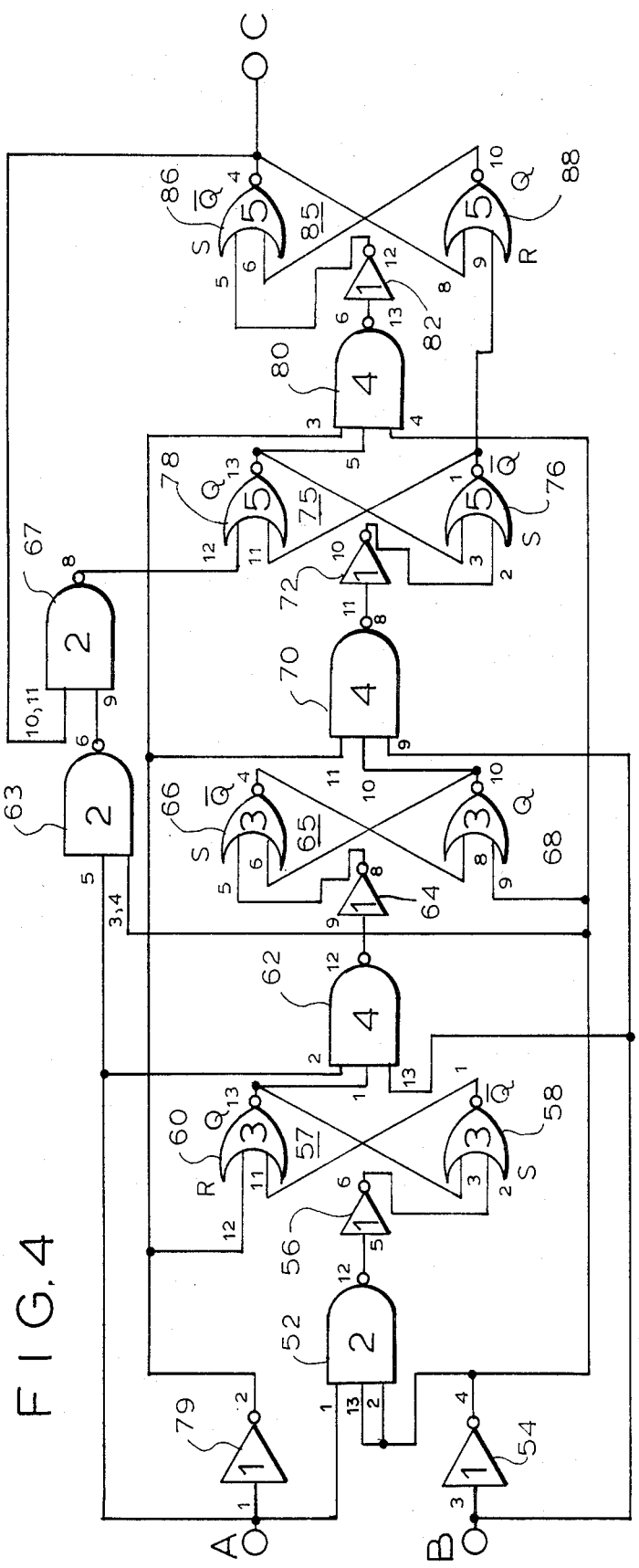

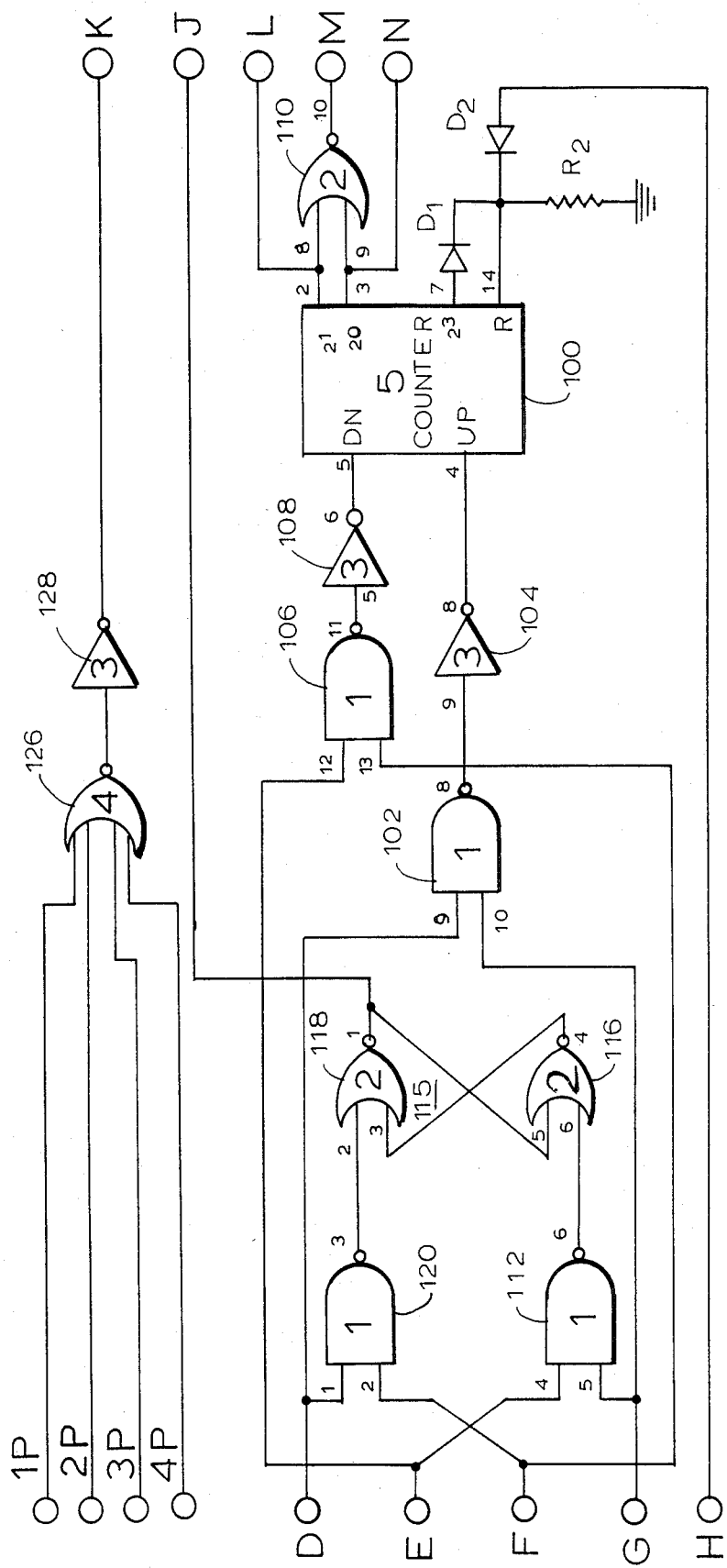
F I G. 5

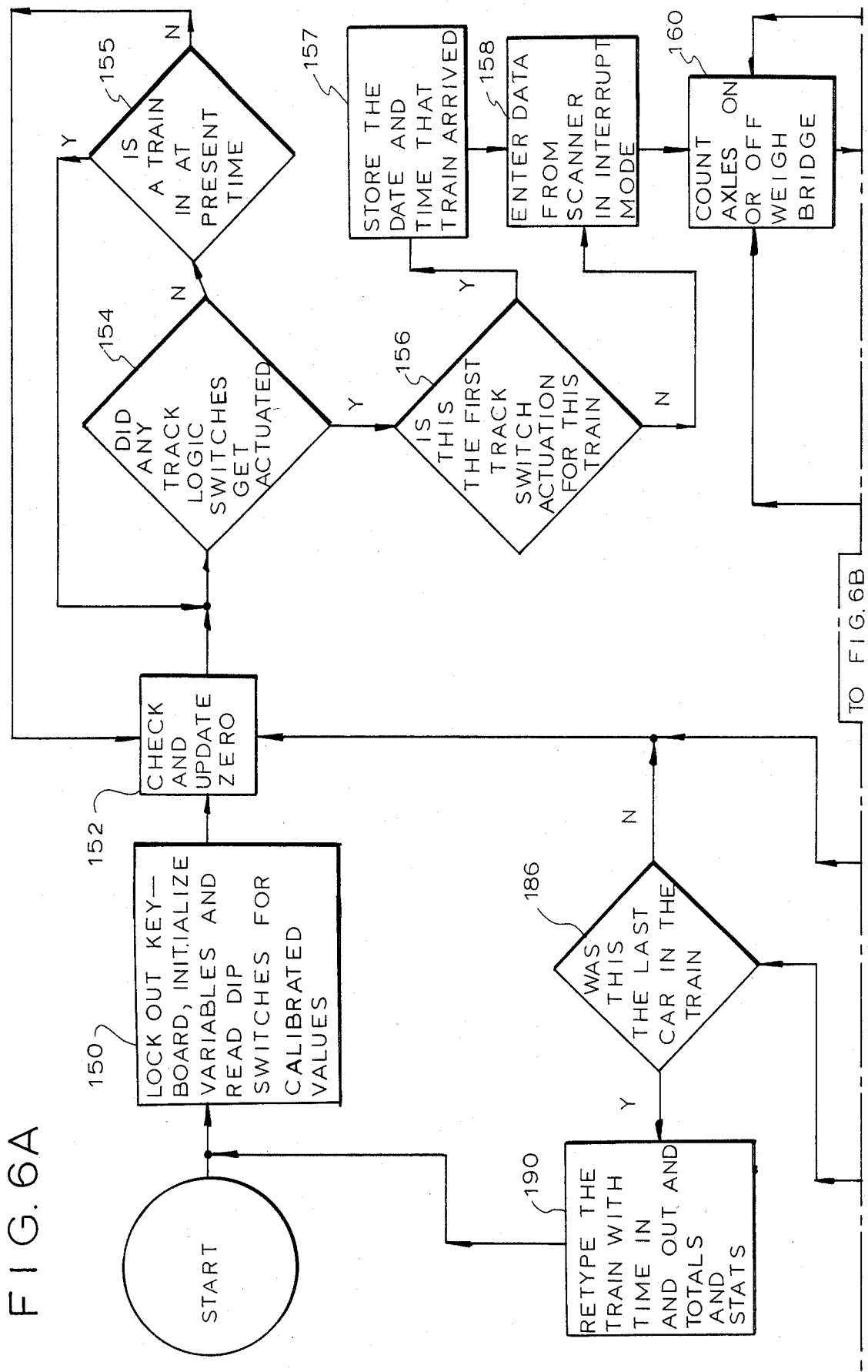

4,512,430

ELECTRONIC COUPLED-IN-MOTION RAILROAD TRACK SCALE

BACKGROUND OF THE INVENTION

This invention relates generally to electronic coupled in motion railroad track scales. More specifically, this invention relates to an electronic coupled-in-motion railroad track scale with a track switch configuration having connected thereto logic electronics which permits the determination of the axle direction and which simultaneously tracks individual cars by counting the axles.

Switch systems for axle direction determination and other purposes such as speed measurement and car size discrimination heretofore have been proposed. In the patent to E. L. Rogers, U.S. Pat. No. 3,406,771, a system using two movable contact switches, and two switches composed of insulated section of rail that are electronically shorted by the wheels of the train and are located just off the weighbridge, is disclosed. Each contact switch is placed approximately six feet from one of the insulated section of rail switches, wherefore the first pair work in conjunction with each other to discriminate between locomotives and rail cars, while the latter pair are utilized to determined overspeed problems.

Tonies et al., U.S. Pat. No. 3,646,327, discloses a method detecting axle and readout synchronism which uses four axle detectors spaced evenly from one another, with three of the detectors on the approach track and one of the detectors on the weigh rail. The first and last detectors are used to record the count totals of axles moving past one or the other detectors along the line of movement of the train. The inner detectors have no counters associated with them but are used to indicate movement.

The in-motion car weighing system disclosed by Johnson et al. in U.S. Pat. No. 4,134,464 includes two sets of load cells and three wheel sensing devices. The wheel sensing devices are used in conjunction with the load cells to provide, in a bidirectinal weighing mode, axle counts and a locomotive car discriminating capacity. Thus, the load cells serve a double duty of determining weight and detecting axles.

While car size discrimination, axle counting and direction determination and other important in-motion weighing system functions have been provided by the prior art, the prior art has not provided a simple, inexpensive, accurate, and reliable system such as that of the present invention.

SUMMARY OF THE INVENTION

In light of the advances in the art of in-motion train weighing systems, it is an object of this invention to provide a low-cost, accurate, reliable and simple in-motion train weighing system which through the use of four track logic switches permits bidirectional weighing.

It is another object of the invention to provide track switches and associated logic circuitry which are used to count train car axles to thereby identify cars by sequence number. Such an arrangement permits the provision of a simple, safe, reweigh feature.

It is also an object of the present invention to provide an in-motion train weighing system having an advantageous zero offset system, a weighing totalization system, a weighing technique which discards weighing data which is deemed faulty, and an over capacity indicator among other features.

Briefly, in accordance with the present invention a computer (CPU), a high-speed programmable voltmeter, four track switches and associated logic, load cells, and two 8 bit DIP switches are provided. The four track switches are arranged so that two are at either end of the weighbridge and train track interface and each switch in the pair are in proximity to the other. With this arrangement, and the associated logic circuitry, each axle of a train car is detected as it enters the weighbridge, and each car is counted in both forward movement and roll-back. Each time that a car moves forward onto the scale, the CPU unit directs the voltmeter to take 2 readings from the load cells, each integrated for 1/6 second to eliminate electrical noise, and transfer the information to the CPU. The two 8 bit DIP switches provide inputs for static and dynamic calibration for the CPU.

Other objects, aspects and advantages of the present invention will be apparent when the detailed description is considered in conjunction with the drawings illustrating the preferred embodiment of the invention, as follows.

BRIEF DESCRIPTION OF THE DRAWINGS

FIG. 1 is a block diagram of the hardware of the in-motion railroad track scale system, illustrating the CPU load cells and digital voltmeter, track switches and other system components;

FIG. 2 is a diagram of the track switches as coupled to the weigh and train rail.

FIG. 3 is a schematic of the track switch circuits, identical for all four track switches;

FIG. 4 is a schematic of a logic circuit which has as its inputs the track switch circuit outputs;

FIG. 5 is a schematic of the counter board logic which has the logic circuits outputs as inputs; and FIGS. 6A and 6B are flow charts of the scale program contained in the system CPU.

DESCRIPTION OF THE PREFERRED EMBODIMENT

Figure 6B:
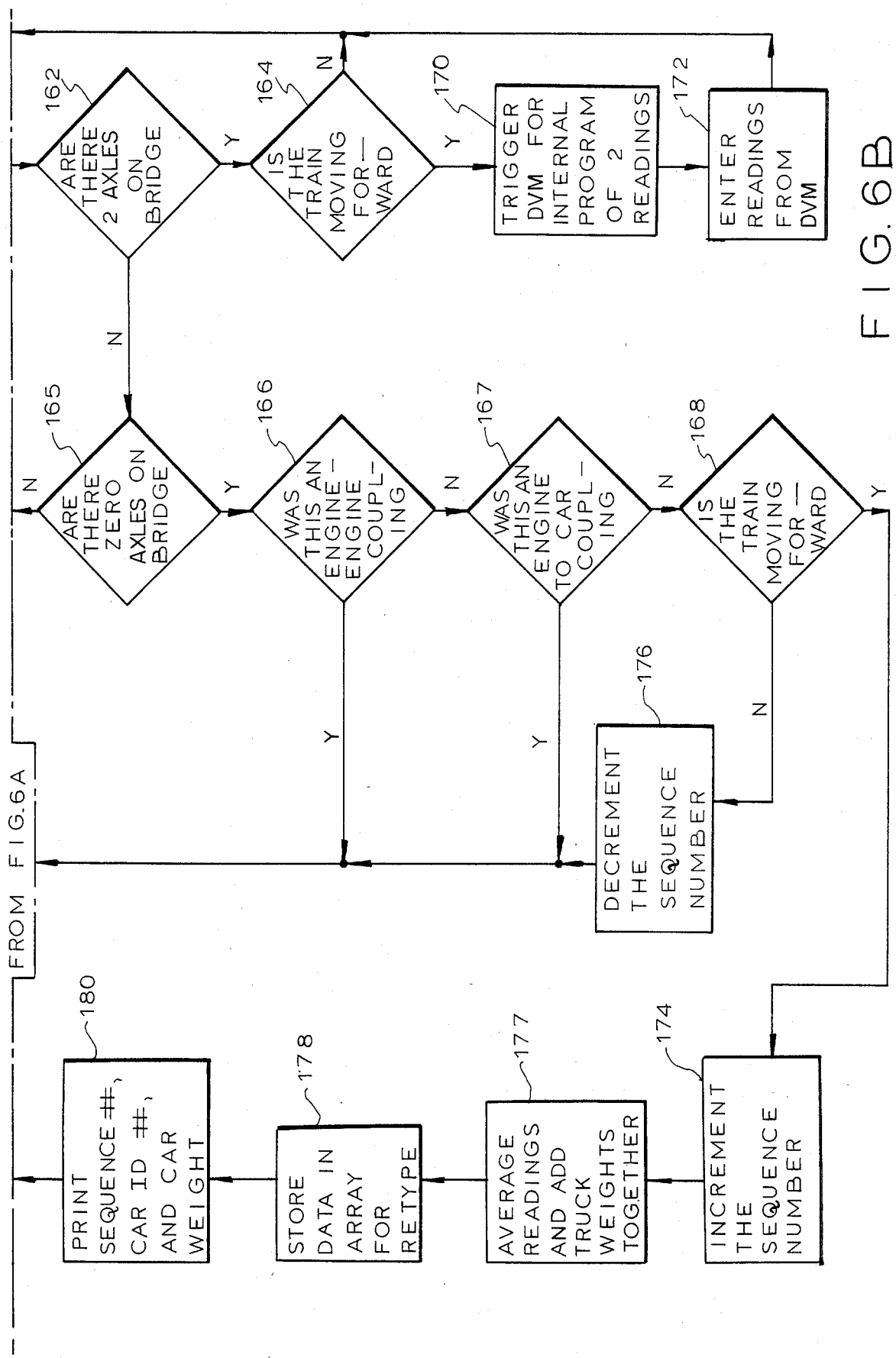

The hardware of the electronic coupled in motion railroad track scale is seen in FIG. 1. A small desk top computer 10, such as a Hewlett-Packard 85A, acts as the CPU brain of the system. The CPU receives information regarding the progression of train cars past track switches 12, 14, 16, and 18 after such information is processed in logic boards 20 and 25 and counter board 30. The logic boards 20 and 25, in conjunction with the counter board 30 count the number of train car axles located on the weighbridge, and determine the direction in which the cars are traveling. If desired, the track switches 12, 14, 16, and 18 may be simulated by a track switch simulator board 32 for testing purposes.

When the counter board 30 transfers specific information to computer 10, the computer is instructed through software to read the voltage from programmable 6½ digit voltmeter 40. The voltmeter 40, such as a Hewlett-Packard 3456A, is calibrated to National Bureau of Standards' tolerances to be sensitive to changes of 3½ pounds. The voltage read by voltmeter 40 is the voltage produced by the four load cells 42 located under the weighbridge, said voltage representing the weight on the bridge. The voltmeter has a programmable memory which is used to store its own program and 2 readings of the load cell output integrated over 1/6 seconds each.

The computer 10 is provided with the means to relate car sequence number as provided through the switches, logic boards and counter board, to the car weight as provided by the load cells and programmable voltmeter. The compiled information may be printed by printer 45. Additional information provided by the automatic car identification scanner 47 may be related to the car sequence number and car weight. Scanner 47 reads the colored labels on the sides of the cars, translates them to numbers, and transfers those numbers to the computer. Yet additional information such as car type, ownership, and contents may be added to the data base manually, if desired.

The various functions provided by the scale system can be better understood from the following detailed disclosure.

FIG. 2 shows the physical arrangement of the railroad track scale. The arrangement 200 consists of train rails 204A and B, a weigh rail 202, and four track switches 12, 14, 16, 18. Train wheels 206A and B are displayed for illustrative purposes only. From FIG. 2, it can be seen that weigh rail 202 is located between train rails 204A and B as separated by spacings 208A and B respectively. While the spacings 208A and B are typically between ⅛-⅜ inches, the exact spacings will vary depending on rail expanding conditions.

Two pairs of track switches (12, 14) and (16, 18) are mounted on the rails, with the switches 12 and 18 mounted to the train rails 204A and 204B respectively, and switches 14 and 16 mounted to the weighing rail 202. Between each of the rollers of track switches 12 and 14, and switches 16 and 18, is a spacing 210 measured from roller center. This spacing 210 being arranged so as to provide for the switch nearest the approaching wheel to close first, and stay closed until the next switch of the pair is activated by the approaching train axle, and ensures that the first switch that closed will de-activate before the second switch of the pair. This spacing 210 is limited in that the above condition must be satisfied for specific wheel and axle combinations.

In operation, the track switches are closed or opened by the passage of the train wheels, with the logic sequence generated by said switch actions controlling the correct weighing of the train car. A typical train car will have four axles (two forward and two rear), while a typical engine will have 6 axles. For a train car, the spacing between the two forward axles cannot be longer than the weigh rail. This ensures that the weight recorded as measured from the weigh rail, and as controlled by the action of the switches, will be the proper weight for that train car and not include the weight of other engine and/or train cars. For similar switch logic reasons, it is also demanded that the length between the last axle of one train car and the first axle of the following train car must be shorter than the length of the weigh rail. Moreover, to allow for zeroing of the voltmeter after weighing one axle pair of the moving train, the length of the train car between the last axle of the forward axle pair and the first axle of the rear axle pair, must be greater than the length of the weigh rail.

Simiarly, the axle spacings of the forward and rear engine axle triplets must also be considered. Wherefore the spacing between the first and last axle of the forward axles triplet must be greater than the length of the weigh rail to ensure that the weight of the these three axles will not be counted as coal weight. Also the spacing between any two adjacent axles of the triplet must be less than the length of the weigh rail so as to prevent the false weighing of these two axles as they would thereby be indistinct from the axles of a train car pair. The complete interaction of the switches with the other features of the scale will be better understood from the following.

As seen in FIG. 3, switches 12, 14, 16, and 18 are each comprised of an automatic switch S1 mounted on the rail, switch S1 being sensitive to the passing of a railroad car thereon, manual switch S2 which is used for simulating track activity and a resistor R1 and a capacitor C1. R1 has a typical resistance of 75 ohms, while the capacitance of capacitor C1 is 60 microfarads. R1 and C1 are used to eliminate switch bounce, and the switch 12 is so arranged such that when either S1 or S2 is closed, the voltage $V_{cc}$ (5 volts) is seen at point P.

The voltages at point P of switches 12, 14, 16, and 18 are used as the inputs A and B into logic boards 20 and 25 of FIG. 1. Switch 12 acts as the A input into Section I of logic board 20, and as the B input into Section II of logic board 20. Switch 14 acts as the B input into Section I and the A input into Section II. Likewise, switches 16 and 18 act as the A input into one section of logic board 25 while acting as the B input into the other section.

Those skilled in the art will therefore appreciate that the Section II input is the inverse of the Section I input into logic board 20 such that a car approaching the weighbridge will cause the logic input sequence in Section I to go from 0,0 to 1,0 to 1,1, while a car backing away from the weighbridge will cause the logic inputs in Section II to follow the same 0,0 to 1,0 to 1,1 sequence. It will also be appreciated that switches 16 and 18 are placed in such close proximity to each other such that a car passing over the switches will cause the A and B inputs into Section III of logic board 25 to follow the logic sequence 0,0 to 1,0 to 1,1 to 0,1 to 0,0. Such a sequence causes a low pulse to appear at the output of Section III of logic board 25.

The logic circuit which produces the pulse in response to the movement of an axle over switches 12 and 14 is seen in FIG. 4. The logic circuit is mostly comprised of four sets of set-reset flip-flops. In the set-reset flip-flops, inputs S and R are 0 in their undisturbed mode. If the S input goes high the flip flop is set, and the Q output goes high while the $\overline{Q}$ output goes low. The flip-flop remains set with a high Q output, even when the S input returns to 0, until the flip-flop is reset by input R going high. When R goes high, the Q output is reset to 0.

The switch logic output as an axle passes switches 12, and 14 appears as 0,0, to 1,0, to 1,1 to 0,1 to 0,0 due to the extreme proximity of switches 12 and 14. At 0,0, the output C is in its start-up (high) position. When input A goes high due to switch 12 having been activated, the inputs into NAND gate 52 are both high, as inverter 54 has inverted the 0 input of input B. Thus, the output from NAND gate 52 which is 0, is inverted in inverter 56, thereby supplying a high input to the set input of flip-flop 57 comprising NOR gates 58 and 60. While flip-flop 57 is set by input A going high, the remainder of the flip-flops are unaffected and thus the output C remains undisturbed. Such a result is understood by recognizing that NAND gate 62 will continue to have a 0 input due to input B being at 0, and thus the output of NAND gate 62 will be high. The high output is inverted by inverter 64 which gives a 0 output into the set input of flip-flop 65. The 1,0 input at A and B serves to reset the third flip-flop 75 (if upon start-up it was set) because if NAND gate 63 has two high inputs, it causes NAND gate 67 to have a low input. With a low input, NAND gate 67 causes the reset input of the flip-flop to go high, thereby resetting the flip-flop. By following the circuitry it can be shown that the resetting of the third flip-flop, in conjunction with the 1,0 input at inputs A, B causes output C to be high (its normal state).

When a car axle passes switch 14 immediately after passing switch 12, the inputs A and B into the logic board 20 switch from 1,0 to 1,1 and flip-flop 65 is set. The requirements of setting flip-flop 65 are that inputs A and B both be high and that flip-flop 57 be set. When those requirements are met, all inputs into NAND gate 62 are high, the output of NAND gate 62 is 0, the output of inverter 64 is high, and flip-flop 65 which is comprised of NOR gates 66 and 68 is set. Again, output C is not affected as the other flip-flops are unaffected. Thus, it will be understood that switches 12 and 14 must be placed in such close proximity for the proper functioning of the system such that a car passing switches 12, and 14 will cause the input logic to go from 0,0 to 0,1 to 1,1 rather than from 0,0 to 1,0 to 0,0 to 0,1. If the latter were the case, flip-flop 65 would never be set, as the return to 0,0 would reset flip-flop 57, causing that input into NAND gate 62 to be low.

As the car axle continues forward, the inputs A and B go to 0,1. Such an input with flip-flops 57 and 65 set cause NAND gate 70 to have all inputs high. The low output of NAND gate 70 is inverted by inverter 72 which causes flip-flop 75, which is comprised of NOR gates 76 and 78, to be set. Simultaneously, the A and B input 0,1 causes flip-flop 57 to be reset. With A at 0, inverter 79 causes the reset input of NOR gate 60 of flip-flop 57 to go high, thereby resetting flip-flop 57.

Finally, as an axle leaves switch 14, the A and B inputs return to 0,0. With flip-flop 75 being set, and inverter 54 and 79 inverting the 0 inputs of B and A respectively, all three inputs into NAND gate 80 are high. The 0 output of NAND gate 80 is inverted by inverter 82, thereby setting flip-flop 85 which is comprised of NOR gates 86 and 88. The setting of flip-flop 85 causes the $\overline{Q}$ output to go low thereby pulsing C low. The low output of flip-flop 85 recirculates to NAND gate 67 causing its output to go high and thereby resetting flip-flop 75. The resetting of flip-flop 75 resets flip-flop 85 due to the fact that when output Q of NOR gate 78 goes low, output $\overline{Q}$ of NOR gate 76 goes high. As the output $\overline{Q}$ of flip-flop 75 acts as the reset of flip-flop 85, a high pulse at $\overline{Q}$ of flip-flop 75 causes flip-flop 85 to reset, thereby ending the low pulse at C.

Simultaneous with the pulse at C and the reset of flip-flops 75 and 85, flip-flop 65 is reset by the 0,0 input of switches 12 and 14. The output at B is inverted by inverter 54. The high output acts as the reset input to NOR gate 68 of flip-flop 65, thereby resetting flip-flop 65. Thus, at the end of the sequence of the inputs to A and B, the output C has been pulsed low and all four flip-flops 57, 65, 75 and 85 have been reset awaiting another sequence of events.

The logic arrangement of FIG. 4 is contained in each section of logic boards 20 and 25 of FIG. 1. Thus, it will be appreciated that a short low pulse at output C of Section I indicates a forward moving axle coming onto the weighbridge. A pulse at output C of Section II indicates a backward moving axle leaving the weighbridge as the inputs A and B from sections 12 and 14 are reversed. A forward moving axle leaving the weighbridge will cause a pulse at output C of Section III of logic board 25, while a pulse at output C of Section IV would indicate a backward moving axle coming onto the weighbridge. In this manner, the location of the four track switches in combination with the logic board circuitry permits a determination of when a car axle comes on or goes off the weighbridge, and the direction in which the axle is moving.

FIG. 5 shows the schematic of the counter board 30 of FIG. 1. Line H resets the counter chip 100 during initial scale turn-on. The connection between pins 7 and 14 of chip 100 protects against counting errors. Line J tells the computer 10 whether or not the train is in roll-back, while line K tells the computer that at least one of the four track switches is closed. Lines L, M and N indicate the presence of two axles on the weighbridge, zero axles on the bridge, and one axle on the bridge respectively.

Looking at the logic circuitry of FIG. 5 in more detail, inputs D, E, F and G correspond to outputs C of Sections I and II of logic board 20 and Section III and IV of logic board 25 respectively. As aforementioned, the normal state of outputs C is high. Thus, a low pulse at D, E, F or G will cause counter 100 to count in the following manner. If D pulses low, NAND gate 102 will have a high output, which is inverted by inverter 104 and thus the up input into counter 100 will be pulsed low. Counter 100 will count one pulse, and the output $2^0$ will go high causing the line N to indicate the presence of one axle on the weighbridge.

If E pulses low, NAND gate 106 will have a high output which is inverted by inverter 108. The low input into counter 100 will pulse the down input and will cause counter 100 to count down, thus causing the $2^0$ output to go low. Thus line N will no longer indicate the presence of an axle. Two low outputs at $2^0$ and $2^1$ of counter 100 will cause NOR gate to output high at line M. Thus, line M will indicate that no axles are on the weighbridge.

A pulse at E will also cause the output of NAND gate 112 to go high thereby causing flip-flop 115 to indicate roll-back on line J. A high input into NOR gate 116 causes a zero input into NOR gate 118. Since, input D and F are high, NAND gate 120 also outputs a low input into NOR gate 118. Thus, the output of NOR gate 118 is high when input E is pulsed. As aforementioned, input E is only pulsed when the axle is moving backward off the weighbridge. Thus, line J indicates roll-back.

A low pulse at input F should indicate a forward moving axle leaving the weighbridge. A low pulse at F causes NAND gate 106 to output high. The inverter 108 thus correctly gives a low pulse at the down input of counter 100.

A low pulse at input G causes NAND gate 102 to output high. Upon inversion at inverter 104, the up input of counter 100 is pulsed indicating the movement of an axle onto the scale. Simultaneously, a low pulse at G causes NAND gate 112 to output high, and NOR gate 116 to output low. Thus, flip-flop 115 outputs high at the output of NOR gate 118, and the output at line J correctly indicates roll-back.

In normal operation, as a train moves forward onto the weighbridge, input D will pulse as each axle passes switches 12 and 14, and input F will pulse as each axle passes switches 16 and 18 upon leaving the weighbridge. As described above, if D is pulsed, counter 100 will count up. Upon a second pulsing of D before any down count, output $2^0$ of counter 100 will go low, and output $2^1$ will go high. With output $2^1$ high, line L goes high and indicates the presence of two axles on the weighbridge. A high input into NOR gate 110 causes line M to return to its low state. If counter 100 continues to receive pulses at the up input without a down pulse, eventually output $2^3$ will go high at pin 7. Diode D1 permits the flow of electricity out of pin 7 through R2 to ground, but in so doing, resets counter 100 because of the connection between pins 7 and 14. The reset of counter 100 in this manner indicates faulty circuitry as it is impossible for eight axles to appear on the weighbridge simultaneously. With proper functioning, after two axles appear on the weighbridge, input F will be pulsed before additional pulsing of D. This result is obtained due to the fact that in order for an axle on another car to pass switches 12 and 14, one axle on the car on the weighbridge would have to pass switches 16 and 18 thereby causing a down count.

Line H is used to reset counter 100 by command from computer 10 as seen in FIGS. 1 and 5. Upon H going high, electricity flows through diode D2 to reset counter 100. Also as seen by FIGS. 1 and 5, line K tells the computer 10 that at least one of the track switches is closed. When one of the switches is closed, the output on that line is high and NOR gate 126 reads low and inverter 125 makes line K read high. Line K is also sensitive to the closing of one of the four switches by track switch simulator 32.

From FIG. 1, it is seen that lines H, J, K, L, M, and N, and the information contained thereon, interface with the computer 10 via interface 130. The computer uses that information in conjunction with information received from load cells 42 via digital voltmeter 40 and interface 132, calibration information received from calibration board 134 via interface 130, and information from scanner 47 via interface 136 to provide a low cost, accurate, reliable and simple in-motion weighing system which permits bidirectional weighing.

Computer 10 is programmed to use the information it receives via the interface and provide useful information to the user. For the best mode of the invention, five modules, each consisting of one or more subroutines, are programmed into the computer. These modules include initialization; autozero and static weighing; track logic and motion weighing; retype, totalization, and statistics; and self diagnostics and special functions.

In the initialization module all arrays are dimensioned and all variables are set to initial values. The static and dynamic calibration values are then read from calibration board 134 which is essentially a series of switches in an electrical box which will normally be sealed by the scale inspector at scale test time. After initialization is complete, the track switches are enabled for interrupts and program execution will continue to the autozero subroutine.

When the system is first energized and no previous zero for tare weight purposes has been established a flag in computer memory for autozero purposes will be zero. This indicates to the computer that the average of the voltmeter readings should be considered as the "zero offset". This zero offset is caused by the weight of the weighbridge and is subtracted from the reading taken during weighing. After the first zero offset is established, the autozero flag will be set to one indicating to the computer that a zero offset has been established. With two exceptions, the zero offset will continue to be updated and changed about every 2.6 seconds after each burst reading from the voltmeter 40. The first exception would be if the update varied from the zero offset by the equivalent of 300 pounds or more. Such a large difference might indicate a malfunction. The second exception is when a train is present and has activated the first track switch 12. This puts the system into its weighing mode, and thereafter zero will only be checked once per car, as soon as the track logic indicates that no axles are on the weighbridge. When the caboose clears the scale, the totalization subroutine is completed, and the information is output to printer 45, the weighing mode flag will be reset, and autozeroing will again be free-running a about 2.6 second per update.

When the autozeroing is free-running, the difference between the voltage received for updated zero offset and the previous zero offset is multiplied by a static calibration factor to give a zero shift in pounds. This number is then displayed on the CRT built into the computer. The static calibration factor appears on the printer output upon power up and after each train.

When the system is placed in manual mode, another flag is set for inhibiting autozero updating. After the manual mode is selected, the "weigh" button on the computer 10 may be pushed. This activates a subroutine which calculates the weight on the weighbridge and output the number via printer 45.

The track logic and motion weighing module integrates the information received from the counter board 30 via track switches 12, 14, 16 and 18, and the logic boards 20 and 25 with information received from the digital voltmeter 40. This module instructs digital voltmeter 40 to take weights only when three prerequisites are met: there must be two or zero axles on the weighbridge (line L or M is high); the train must be going forward (line J is low); and the track switches are no longer active (line K is low). Under strictly forward motion, the following parts of the train will yield two axles on the weighbridge and no switches active the indicated number of times;

a. first Truck of Engine: 2
b. Engine To Engine Coupling: 4
c. Engine To Car Coupling: 4
d. Car To Car Coupling: 3
e. Car to Caboose Coupling: 2 or 3
f. Last Truck Of Caboose Or Last Truck Of Last Car In Train: 1

According to the invention, the digital voltmeter (DVM) takes two readings from the load cells, each integrated over 1/6 second (10 power line cycles). A weight is calculated for any reading of two axles, preferably after the wheels clear the weighbridge and track switches, but only for the two axle groups which are decoded from the previous chart to be trucks of a car or caboose. Readings are ignored if two axles on the bridge are one axle on each of two cars or axles of engines.

If a car moves backward, the program accounts for the car location by counting axles, and the digital voltmeter is instructed to take a weight reading only during forward motion. If the train moves back two car lengths and then starts forward, a car may be reweighed. Regardless of the amount of backward motion occuring, the motion weighing program module insures that any particular car will always have the same sequence number. Such a feature is particularly helpful in the weighing of cars before and after unloading.

For in-motion weighing, the car weights are calculated as follows:

Weight (lbs)=(DVM reading average−DVM offset)×Static Calibration Value×Dynamic Calibration Value wherein: the DVM reading is measured in microvolts ($\mu$V) and is read from the voltmeter 40 when weight is on the weighbridge, the DVM zero offset is measured in $\mu$V from voltmeter 40 when no weight is on the weighbridge; the static calibration value is in pounds/$\mu$V and is set by the initialization module from values stored by an 8 bit DIP switch in calibration board 134; and the dynamic calibration value is dimensionless and is set by the initialization module from values stored in another 8 bit DIP switch in calibration board 134. The dynamic calibration values are only used during in-motion weighting, and their purpose is to compensate for physical and mechanical effects introduced into the weighing process due to the motion of the train.

If desired, scanner data from ACI scanner 47 may be input to the computer 10, through serial interface 136. An integral part of the serial interface is a small microprocessor which is capable of being interrupted by incoming data. With a pause of about 10 milliseconds to the main computer, the serial interface microprocessor can input scanner data while the microprocessor 10 is free to continue program execution.

When the computer detects two axles moving forward onto and continuing forward off the weighbridge followed by zero axles on the weighbridge, internal computer logic determines that the last car of the train has just cleared the scale. In response, the computer activates a retype subroutine which provides a copy of sequentially ordered car data. In the best mode, the retype subroutine eliminates multiple lines of data on the same cars due to reweighing caused by the backing up of the train.

The information format for the retype subroutine data which may appear on a CRT (not shown) provided with computer 10 or printer 45 is:

time and date train arrived,
time and date train departed,
sequence #, car label, weight in pounds.

If scanner 47 is not provided, or was not successful in reading the provided information on the car, the car label will be identified as "- - - - - - - -". In the event the train had backed up during weighing and a car was weighed more than once, only the most recent weight is printed.

Located in the same module with the retype subroutine is the totalization subroutine. In this subroutine, when the program execution proceeds to output the scale data for each car, the weight of each car is added to an accumulator variable. After the information for the complete train is output, the caboose weight is subtracted and the accumulated total weight of all cars is converted from pounds to tons and output to printer 45 and the computer CRT.

Concurrent with both the retype and totalization subroutines, the train cars are classified as to weight ranges by number and percentage. For example, one coal train was weighed and classified as follows:

| Number Of Cars | Weight Range (lbs.) | Percentage |
| --- | --- | --- |
| 17 | <253,000 | 16% |

| Number Of Cars | Weight Range (lbs.) | Percentage |
| --- | --- | --- |
| 37 | 253,-258,000 | 35% |
| 41 | 258,-263,000 | 39% |
| 8 | 263,-265,630 | 8% |
| 2 | >265,630 | 2% |

In addition, if desired an average car weight may be calculated and printed. Also printed are the static and dynamic calibration values. This record of the calibration values will remain with the printout to enable verification of the values at the time of weighing.

The self-diagnostics and special functions module of computer 10 permits the selection of several options for operating the scale. Upon power-up, the scale will start out in "automatic mode" and will automatically weigh all trains. Upon user command, the scale system will go to "manual mode". From manual mode, the time and date may be set, and the system will automatically return to manual mode. Upon another command, one static weigh cycle will be accomplished and then the system will return to manual mode again. When desired, the user may return the scale to automatic mode. When automatic mode is again selected, all variables are re-initialized.

Likewise, from either the automatic or manual mode, the user may command the scale to switch from 100 pound increments during in-motion weighing to 10 pound increments. On power-up the scale will start weighing in 100 pound increments. However, static weighing will be output in 10 pound increments. Also from either mode, the user may select to be in either passive compliance or total compliance with National Bureau of Standards Handbook 44, paragraph S.2.5.1., hereinafter described.

Along with special function commands outlined above, the computer is provided with a self-diagnostic error trapping subroutine. This subroutine is used upon the failure of a component of the system. A failure will generate a computer error which can be more easily troubleshot if clues to the problem are found by the computer and then printed on printer 45 or on the CRT connected to the computer.

The best mode of the invention also complies with the specifications from Section 2.20 of the National Bureau of Standards' Handbook 44. Thus, an overcapacity indicator is provided when the weight on the weighbridge is determined to be in excess of the capacity of te system. A system warmup timer is provided to prevent use of a scale which is unstable because of inadequate warmup time. A security seal is placed on the terminal box in which the calibration switches 134 are located by the scale inspector so that no tampering of calibration can be accomplished without detection.

As aforementioned, the invention also permits compliance with paragraph S.2.5.1 of Handbook 44 of the National Bureau of Standards. This specification is intended to prevent weighing when the weight is oscillating more than 3 scale divisions (300 lbs.). The weight oscillation problem has been cut to a minimum according to the invention by use of a "long term integration" period of the voltmeter. Ten power line cycles were chosen as the integration period most suited for this application. With a ten power line cycle integration period virtually all electrical noise and oscillations are removed and all but the large spikes resulting from irregularities or flat spots on the wheels of the train cars are eliminated. Still, when weighing in the coupled-in-motion mode, it is not uncommon to see 2-3% of all cars weighed having a variation of more than 300 pounds on the two integrated readings which are taken to determine a truck weight. For this reason the scale is designed to actively or passively comply with this specification. Upon power-up, the system is initialized to comply passively, i.e., the weight will still be printed, but a "#" will be printed after the weight if the two readings of either end of the car weight vary by more than 300 pounds. Upon command, the system will be switched to active compliance. In this mode the weight printed will become "0" if the two readings vary by more than 300 pounds.

A flow chart which utilizes some of the subroutines of the aforedescribed modules is shown in FIG. 6, and represents a simple version of the detail and the manner in which CPU 10 is programmed. Upon power-up at 150, the variables are initialized according to the initialization subroutine, and the calibration values are read in from calibration board 134. At 152, the autozero subroutine is run to establish a zero offset. If the track switch and logic system provides an indication of the approach of a train at 154, the computer 10 proceeds to the main body of the program. Otherwise, the computer directs a continual checking and updating of the zero offset, unless at 155 it is determined that a train is present.

In the main program at 157, the computer 10 stores the time and date the train arrived for the heading used in the retype subrouting if at 156 it is determined that this is the first track switch activation of the train. Data from scanner 47 is enabled via interface 136 into the computer at 158, and the number of axles on the weighbridge (determined by switches 12,14,16, and 18, logic boards 20 and 25, and counter board 30) is counted at 160. The track logic and motion weighing module is implemented at 162,164 and 166, such that the instruction for weighing will not resume until two axles are detected on the bridge and it is determined that the train is moving forward. Additionally, before the calculating of a weight from the DVM readings is to occur, the computer 10 must determine that the two axles on the weighbridge represent the axles of a car or a caboose. Such a determination is accomplished by having the computer store and continually update the number of times two axles appear on the weighbridge and when zero axles are on the weighbridge and compare that to a chart which will provide an answer.

If the weighing prerequisites are met, the digital voltmeter 40 is triggered at 170, and at least one integration of the load cell output is achieved thereby providing at 172 readings proportional to the weight of the car on the weighbridge. These readings are then stored and not used until at 165, the computer 10 determines from counter board 30 that the train has moved to a position with no axles resting on the weighbridge. If the number of times that two axles were on the bridge indicates that an engine-engine coupling or an engine-car coupling just passed across the scale, than no weight is calculated from these readings, but the computer 10 will just check the zero and update if necessary. If not partly an engine, it is a car-car coupling. If this car is rolling back, 168 will direct program execution to 176, where the sequence number is decremented and then fed to the autozero sub at 152. Otherwise, the sequence number of the car is determined at 174, and the weight, sequence number, and scanner car identification number are stored at 178 and printed at 180. If at 186 the car was determined to be the last car of the train, the total weight and statistics may be printed at 190. Otherwise, the program returns to autozero subroutine 152, and waits for track switch activity at 154.

While the present invention has been described in connection with the preferred embodiment thereof, it is to be understood that additional embodiments and modifications which will be apparent to those skilled in the art are included within the spirit and scope of the invention as described in the specification and set forth in the appended claims.

We claim:

1. An electronic coupled-in-motion railroad track scale system for determining the weight of train cars moving in either direction over a weighbridge, comprising:
   (a) at least one load cell for providing an electrical signal indication of the weight of the train car on said weighbridge;
   (b) a digital voltmeter for reading the electrical signal provided by at least one load cell and determining the weight of the train car on said weighbridge;
   (c) four track switches for signaling the passing of a train car axle, pairs of said switches being located at each end of said weighbridge, wherein the two switches of each pair are located in close proximity to each other, one of said two switches of each pair being located on said railroad track and the other of said two switches being located on said weighbridge;
   (d) logic circuitry for receiving the indications of said four track switches, wherein said logic circuitry ascertains the direction of said train and signals occurrences of two car axles on said weighbridge;
   (e) A computer for receiving the signals of said logic circuitry for directing said digital voltmeter to read said load cell signal, for determining said train car weight when said logic circuitry signal indicates that two car axles are on said weighbridge and are moving in a forward direction, for reading the train car weight from said digital voltmeter and for outputting the weight of said train car; and
   (f) display means for displaying the output of said computer.

2. An electronic coupled-in-motion railroad track scale system for determining the weight of train cars moving in either direction over a weighbridge, comprising:
   (a) at least one load cell for providing an electrical signal indication of the weight of the train car on said weighbridge;
   (b) a digital voltmeter for reading the electrical signal provided by at least one load cell and determining the weight of the train car on said weighbridge;
   (c) four track switches for signaling the passing of a train car axle, pairs of said switches being located at each end of said weighbridge, wherein the two switches of each pair are located in close proximity to each other;
   (d) logic circuitry for receiving the indications of said four track switches, wherein said logic circuitry ascertains the direction of said train and signals occurrences of two car axles on said weighbridge, said logic circuitry including four logic sections, and a counter section, each of said logic sections having as inputs the outputs of one of said pairs of track switches, and each of said logic sections being comprised of four set-reset flip-flops which when consecutively set by an input logic progression of (1,0), (1,1), (0,1), and (0,0) outputs a pulse indicating the passing of a train car axle;

(e) a computer for receiving the signals of said logic circuitry for directing said digital voltmeter to read said load cell signal, for determining said train car weight when said logic circuitry signal indicates that two car axles are on said weighbridge and are moving in a forward direction, for reading the train car weight from said digital voltmeter and for outputting the weight of said train car; and (f) display means for displaying the output of said computer.

3. An electronic coupled-in-motion railroad track scale system for determining the weight of train cars moving in either direction over a weighbridge according to claim 2, wherein:

an output pulse of one of said logic sections indicates a forward moving axle coming onto said weighbridge;

an output pulse on a second of said logic section indicates a backward moving axle leaving said weighbridge;

an output pulse on a third of said logic sections indicates a forward moving axle leaving said weighbridge; and an output pulse on the fourth of said logic sections indicates a backward moving axle coming onto said weighbridge.

4. An electronic coupled-in-motion railroad track scale system for determining the weight of train cars moving in either direction over a weighbridge, comprising:

(a) at least one load cell for providing an electrical signal indication of the weight of the train car on said weighbridge;

(b) a digital voltmeter for reading the electrical signal provided by at least one load cell and determining the weight of the train car on said weighbridge;

(c) four track switches for signaling the passing of a train car axle, pairs of said switches being located at each end of said weighbridge, wherein the two switches of each pair are located in close proximity to each other;

(d) logic circuitry for receiving the indications of said four track switches, wherein said logic circuitry ascertains the direction of said train and signals occurrences of two car axles on said weighbridge;

(e) a computer for receiving the signals of said logic circuitry for directing said digital voltmeter to read said load cell signal, for determining said train car weight when said logic circuitry signal indicates that two car axles are on said weighbridge and are moving in a forward direction, for reading the train car weight from said digital voltmeter and for outputting the weight of said train car, and wherein said computer counts the number of times said logic circuitry indicates the occurrence of two car axles on said weighbridge, and after all axles leave the weighbridge is programmed to determine by said count when the indication of two car axles on said weighbridge indicates an engine, a coupling or a car on said weighbridge; and (f) display means for displaying the output of said computer.

5. An electronic coupled-in-motion railroad track scale system for determining the weight of train cars moving in either direction over a weighbridge according to claim 4, wherein:

said computer stores in memory the weight of each train car weighed, totals the weight of said cars, and outputs from memory for display on said display means the sequence number and weight of each train car, and the total weight of the cars of the train.

6. An electronic coupled-in-motion railroad track scale system for determining the weight of train cars moving in either direction over a weighbridge according to claim 5, further comprising:

automatic scanning means for scanning car identification numbers, and for inputting the scanned information into said computer, wherein said computer coordinates said scanned information with said car sequence number and outputs for display the car identification number with the sequence number and car weight; and wherein said display means further displays said identification number, said sequence number and said car weight.

7. An electronic coupled-in-motion railroad track scale system for determining the weight of train cars moving in either direction over a weighbridge according to claim 3, wherein:

said logic circuitry further signals the occurrence of zero axles on said weighbridge, and the occurrence of one axle on said weighbridge; and said computer directs said digital voltmeter to read said load cell signal to determine a zero offset whenever said logic circuitry signals the occurrence of zero axles on said weighbridge.

8. An electronic coupled-in-motion railroad track scale system for determining the weight of train cars moving in either direction over a weighbridge according to claim 6 further comprising:

a calibration board for storing static calibration values and dynamic calibration values and for inputting said stored static and dynamic calibration values into said computer, wherein said weight determined by said voltmeter is corrected by said computer using said static and said dynamics calibration values when said train cars are weighed in motion, and said weight determined by said voltmeter is corrected by said computer using said static calibration values when said train cars are weighed when stationary.

9. An electronic coupled-in-motion railroad track scale system for determining the weight of train cars moving in either direction over a weighbridge according to claim 8 wherein:

said computer is programmed to classify the train cars by weight range and to provide the number and precentage of cars in each weight range; and said computer is programmed to provide the average weight of the cars in a train.

* * * * *